Dec. 2, 1941.   L. E. GILES   2,264,970
MACHINERY PACKING
Filed June 7, 1940

INVENTOR
Louis E. Giles,
BY Fraser, Myers & Manley,
ATTORNEYS.

Patented Dec. 2, 1941

2,264,970

UNITED STATES PATENT OFFICE 2,264,970

MACHINERY PACKING

Louis E. Giles, New York, N. Y., assignor to The Garlock Packing Company, Palmyra, N. Y., a corporation of New York Application June 7, 1940, Serial No. 339,292

1 Claim. (Cl. 288—3)

This invention relates to improvements in machinery packings, and is particularly adapted for use as an oil seal to close an annular space between a rotatable shaft and its housing or between other analogous relatively movable machine elements.

It is an object of the invention to provide an oil seal comprising a metal shell to be mounted in the housing surrounding the shaft with which the seal is to be assembled, a resilient sealing element for the shaft having a flange backed against a flange of the shell, a contractile spring to maintain the lip of the sealing element in frictional contact with the shaft, and a ring of channel-shaped form in cross section, with the entrance to the channel facing inwardly toward the shaft, the said channel comprising one element adapted to be forcibly pressed against the flange of the sealing element and to hold it in fluid-tight engagement with the flange of the shell, and another element adapted to serve as an end closure for the shell and prevent accidental dislodgement of the spring from its assembled relation with the lip of the sealing element.

In the accompanying drawing illustrating preferred forms of the foregoing invention, Figure 1 is a fragmentary cross-sectional view of one form of oil seal embodying the invention which has been generally described.

Figure 1:
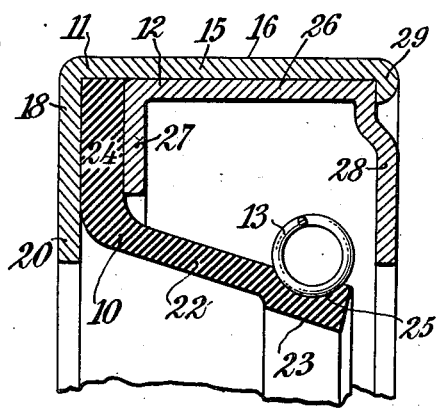
Figure 2:
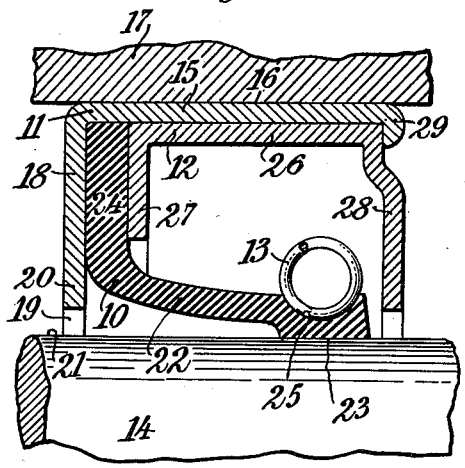
Fig. 2 is a fragmentary cross-sectional view of the form of the invention illustrated by Fig. 1 as assembled with a shaft and its housing.

The form of the invention illustrated by Figs. 1 and 2 comprises in general a flexible sealing element 10, clamped within a metal shell 11 by means including an annular ring 12, and having a garter spring 13 to maintain a part of the sealing element in its sealing relation with the shaft 14 with which the device is intended to be used.

The metal shell may comprise an annular element 15, having a cylindrical external surface 16 to be mounted in fluid-tight contact with the inner surface of a part of the housing 17 which surrounds the shaft 14.

The cylindrical element 15 of the shell may have at one of its margins an inwardly directed flange 18 of dimensions such as to provide a free working clearance 19 between its inner margin 20 and the outer surface 21 of the shaft.

The sealing element 10 may have a sleeve-like portion 22 adapted to encircle and extend along a part of the shaft 14 intended to be surrounded by the shell. This sleeve-like portion of the sealing element may have a terminal lip 23 at one of its margins to be held in snug contact with the shaft and an outwardly directed flange 24 at its opposite margin to be seated against and backed up by the flange 18 of the shell.

The garter spring 13 may be seated in an annular depression 25 in the lip 23 of the sealing element.

The ring 12, which is regarded as an important novel feature of the invention, is of channel-shaped form in cross section, having a cylindrical portion 26 adapted to be mounted in snug contact with the inner surface of the element 15 of the shell, an inwardly directed flange 27, along one of its margins, adapted to be held in snug contact with the flange 24 of the sealing element, and an inwardly directed flange 28, extending about its opposite margin, adapted to serve as an end closure for the shell and as means for preventing accidental dislodgment of the garter spring 13 from its cooperative relation with the lip 23 of the sealing element.

The flange 24 of the sealing element and the clamping ring 12 may be fixedly held in a state of compression between the marginal flange 18 of the shell and a lip 29 which may be turned inwardly from the opposite margin of the shell so as to serve as a backing for the clamping ring. The dimensions of the assembled parts may be such that the flange 24 of the sealing device will be held in fluid-tight engagement with the opposed surface of the flange 18 of the shell.

Figure 3:
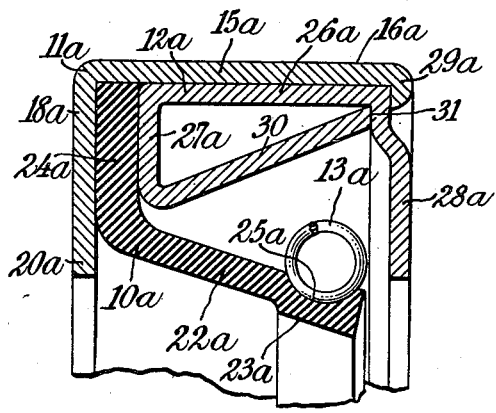
Fig. 3 is a fragmentary cross-sectional view of a modified form of the invention, which differs from the form illustrated by Fig. 1 in that the annular ring which serves as a clamping means for the sealing element and as a part of the end closure for the shell has a reinforced flange of triangular form in cross section.

The form of the invention illustrated by Fig. 3 differs from that illustrated by Figs. 1 and 2 in that the flange 27a of the clamping ring 12a is provided with a conical extension 30, having its margin in abutting relation with the inner surface of the base of the flange 28a at 31, thus providing a strongly reinforced compression element for the flange 24a of the sealing element, said compression element consisting of the structure of triangular form in cross section built up of the parts 26a, 27a and 30 of the clamping ring 12a.

As in the case of the form of the invention illustrated by Fig. 1, the flange 28a of the clamping ring serves as the end closure for the shell which serves as a means of preventing dislodgment of the garter spring 13a from its cooperative relation with the lip 23a of the sealing element.

Since corresponding parts of the forms of the invention illustrated by Figs. 1 and 3 are designated by like reference characters, with the exception that the letter a has been added to each of the characters applied to the form illustrated by Fig. 3, no further description of this form of the invention is called for.

The invention is not intended to be limited to either of the forms which have been selected for purposes of illustration, but should be regarded as covering modifications and variations thereof within the scope of the appended claim.

What is claimed is:

A device adapted to seal the space between a shaft and its housing; said device comprising a metal shell to be mounted fluid-tight in the housing and having an inwardly disposed marginal flange of dimensions such as to clear the shaft; a flexible sealing element having a sleeve to extend along a part of the shaft to be surrounded by the shell, said sleeve terminating at one margin in a lip to be held in contact with the shaft and having at its opposite margin an outwardly disposed flange backed against the flange of the shell; a garter spring surrounding the lip of the sealing element and holding it in fluid-tight contact with the shaft; and means for closing the otherwise open end of the shell and for clamping the sealing element in its assembled relation therewith, said means comprising an inturned lip on the margin of the shell opposite that which backs the flange of the sealing element and a ring of channel-shaped form in cross section clamped between said lip and said flange, said ring comprising a cylindrical element to be held in contact with the inner surface of the shell, an inwardly directed marginal flange to serve as a clamping element for the flange of the sealing element and a second, inwardly disposed marginal flange to serve as a closure for the shell and prevent accidental dislodgment of the garter spring from its position in engaging relation with the lip at the end of the sleeve of the sealing element, the said inwardly directed, marginal flange of the clamping ring which serves as a clamping element for the flange of the sealing element being part of a triangular construction including a conical bracing element extending from the margin of the said clamping flange to the base of the oppositely disposed marginal flange which serves as a closure for the shell.

LOUIS E. GILES.